US012580280B2

(12) United States Patent (10) Patent No.: US 12,580,280 B2
Zheng et al. (45) Date of Patent: Mar. 17, 2026

(54) NEGATIVE ELECTRODE SHEET, SECONDARY BATTERY, BATTERY MODULE, BATTERY PACK, AND ELECTRIC DEVICE

(71) Applicant: CONTEMPORARY AMPEREX TECHNOLOGY CO., LIMITED, Ningde (CN)

(72) Inventors: Yilin Zheng, Ningde (CN); Xiaoming Ge, Ningde (CN); Yiheng Wang, Ningde (CN); Xueqing Xiong, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/304,203

(22) Filed: Aug. 19, 2025

(65) Prior Publication Data

US 2025/0372836 A1 Dec. 4, 2025

Related U.S. Application Data

(63) Continuation of application No. PCT/CN2023/129927, filed on Nov. 6, 2023.

(30) Foreign Application Priority Data

Apr. 26, 2023 (CN) .......................... 202310462572.0

(51) Int. Cl.
*H01M 50/536* (2021.01)
*H01M 4/02* (2006.01)
*H01M 4/66* (2006.01)

(52) U.S. Cl.
CPC ......... *H01M 50/536* (2021.01); *H01M 4/663* (2013.01); *H01M 4/667* (2013.01); *H01M 2004/021* (2013.01); *H01M 2004/027* (2013.01)

(58) Field of Classification Search
CPC .... H01M 50/536; H01M 4/663; H01M 4/667; H01M 2004/021; H01M 2004/027
See application file for complete search history.

(56) References Cited

FOREIGN PATENT DOCUMENTS

| CN | 104577041 A | 4/2015 |
| CN | 107910486 A | 4/2018 |
| CN | 209217117 U | 8/2019 |
| CN | 107910486 B | 12/2021 |

OTHER PUBLICATIONS

The World Intellectual Property Organization (WIPO) International Search Report and Written Opinion for PCT/CN2023/129927 Feb. 7, 2024 14 Pages (including translation).

*Primary Examiner* — Helen Oi K Conley

(74) *Attorney, Agent, or Firm* — ANOVA LAW GROUP, PLLC

(57) ABSTRACT

A negative electrode sheet, a secondary battery, a battery module, a battery pack, and an electric device. The negative electrode sheet includes an electrode sheet body, a tab, and a connecting member. The electrode sheet body includes a plurality of layers of carbon fibers. At least two of the plurality of layers of carbon fibers are connected to the connecting member. The tab is electrically connected to the electrode sheet body through the connecting member.

15 Claims, 3 Drawing Sheets

5

5

NEGATIVE ELECTRODE SHEET, SECONDARY BATTERY, BATTERY MODULE, BATTERY PACK, AND ELECTRIC DEVICE

CROSS-REFERENCE TO RELATED APPLICATIONS

The present application is a continuation of International Application No. PCT/CN2023/129927, filed on Nov. 6, 2023, which claims priority to Chinese Patent Application No. 202310462572.0, filed with the China National Intellectual Property Administration on Apr. 26, 2023 and entitled "Negative Electrode Sheet, Secondary Battery, Battery Module, Battery Pack, and Electric Device", which are incorporated herein by reference in their entirety.

TECHNICAL FIELD

Embodiments of the present application relate to the technical field of secondary batteries, and in particular, to a negative electrode sheet, a secondary battery, a battery module, a battery pack, and an electric device.

BACKGROUND

In a secondary battery with carbon fiber as a negative collector, due to different materials of the carbon fiber and a tab, extraction through the tab is a process difficulty. At present, two methods, i.e., mechanical connection and conductive adhesive connection, are mainly used. At present, conductive performance of conductive adhesive is generally poor, and the mechanical connection method is more common. A common mechanical connection method is to plate the carbon fiber with metal and then weld the tab on the metal. This method has a good current extraction effect. However, plating the carbon fiber with metal increases process costs and production time, which has certain limitations on large-scale production of the battery.

SUMMARY

The present application has been made in view of the above problems, and an objective thereof is to provide a connection method between carbon fiber and a tab that is time-saving and cost-saving and has a high connection effect.

In order to achieve the above objective, provided in a first aspect of the present application is a negative electrode sheet, comprising an electrode sheet body, a tab, and a connecting member, wherein the electrode sheet body comprises a plurality of layers of carbon fibers, at least two of the plurality of layers of carbon fibers are connected to the connecting member, and the tab is electrically connected to the electrode sheet body through the connecting member.

Therefore, in the present application, the at least two of the plurality of layers of carbon fibers are connected to the connecting member, so that current extraction efficiency of the electrode sheet is improved, and connection strength between the electrode sheet body and the connecting member is improved.

In some embodiments, one end of the plurality of layers of carbon fibers is of a stepped structure, the stepped structure comprises at least two step surfaces, and the at least two step surfaces are attached to the connecting member. Therefore, current extraction efficiency of the electrode sheet and connection strength between the electrode sheet body and the connecting member are further improved.

In some embodiments, one end of the connecting member is of an inverted stepped structure, and the inverted stepped structure is adapted to the stepped structure. Therefore, current extraction efficiency of the electrode sheet and connection strength between the electrode sheet body and the connecting member are further improved.

In some embodiments, the connecting member is a metal mesh. Therefore, current extraction efficiency of the electrode sheet and connection strength between the electrode sheet body and the connecting member are further improved, a manufacturing process is simplified, and energy density of a battery is improved.

In some embodiments, the plurality of layers of carbon fibers comprises at least three layers of carbon fibers. Therefore, current extraction efficiency of the electrode sheet and connection strength between the electrode sheet body and the connecting member are further improved, and energy density of the battery is improved.

In some embodiments, each of the plurality of layers of carbon fibers is attached to the connecting member. Therefore, current extraction efficiency of the electrode sheet and connection strength between the electrode sheet body and the connecting member are further improved.

In some embodiments, the widths L of the at least two step surfaces are equal. Therefore, connection strength between the electrode sheet body and the connecting member is further improved, and a manufacturing process is simplified.

In some embodiments, an angle $\theta$ between a chamfered plane formed by edges of the at least two step surfaces and a main plane of the electrode sheet body is less than or equal to 45° (degrees). Therefore, current extraction efficiency of the electrode sheet and connection strength between the electrode sheet body and the connecting member are further improved.

In some embodiments, the negative electrode sheet further comprises a fastener, wherein the connecting member is fixedly connected to the electrode sheet body through the fastener. Therefore, connection strength between the electrode sheet body and the connecting member is further improved, and a manufacturing process is simplified.

In some embodiments, the connecting member is fixedly connected to the at least two step surfaces through the fastener. Therefore, connection strength between the electrode sheet body and the connecting member is further improved.

In some embodiments, a position at which the tab is fastened to the connecting member is different from a position at which the fastener is fastened to the connecting member. Therefore, connection strength between the tab and the connecting member is further improved.

In some embodiments, the fastener is a pin. Therefore, current extraction efficiency of the electrode sheet and connection strength between the electrode sheet body and the connecting member are further improved, and a manufacturing process is simplified.

Provided in a second aspect of the present application is a secondary battery, comprising the negative electrode sheet according to the first aspect of the present application.

Provided in a third aspect of the present application is a battery module, comprising the secondary battery according to the second aspect of the present application.

Provided in a fourth aspect of the present application is a battery pack, comprising at least one of the secondary battery according to the second aspect of the present application or the battery module according to the third aspect of the present application.

Provided in a fifth aspect of the present application is an electric device, comprising at least one of the secondary battery according to the second aspect of the present application, the battery module according to the third aspect of the present application, or the battery pack according to the fourth aspect of the present application.

DESCRIPTION OF DRAWINGS

In order to clearly describe the technical solutions of the embodiments of the present application, the accompanying drawings required for describing the embodiments of the present application will be briefly described below. Apparently, the accompanying drawings described below are only some embodiments of the present application. A person of ordinary skill in the art may further derive other drawings from these accompanying drawings without creative efforts.

DESCRIPTION OF REFERENCE SIGNS

Figure 1:
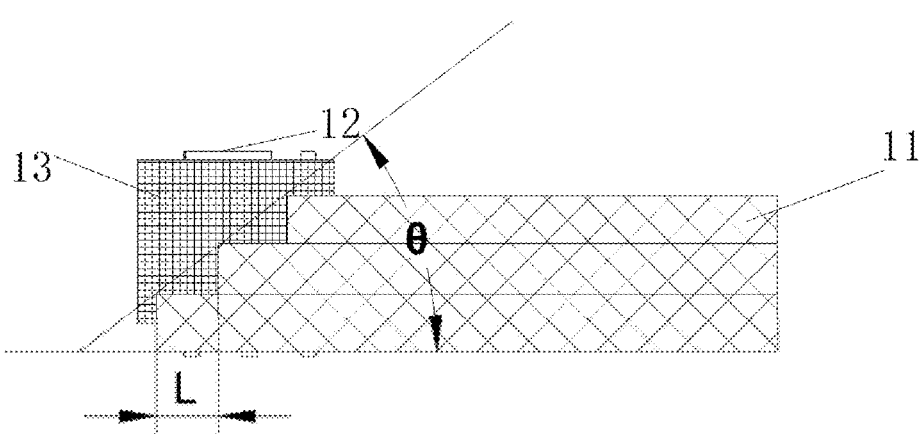
FIG. 1 is a schematic diagram of a structure of an electrode sheet according to an embodiment of the present application.

11. electrode sheet body; 12. tab; 13. connecting member; 14. fastener; 1. battery pack; 2. upper case; 3. lower case; 4. battery module; 5. secondary battery; 51. housing; 52. electrode assembly; 53. top cover assembly.

DESCRIPTION OF EMBODIMENTS

With appropriate reference to the accompanying drawings, the following describes in detail embodiments in which a carbon fiber electrode sheet, a secondary battery, a battery module, a battery pack, and an electric device in the present application are specifically disclosed. However, an unnecessary detailed description may be omitted. For example, a detailed description of well-known matters and repeated descriptions of a substantially same structure may be omitted. This is to avoid the following descriptions from becoming unnecessarily redundant and to facilitate understanding by those skilled in the art. The accompanying drawings and the following descriptions are provided for those skilled in the art to fully understand this application, and are not intended to limit subject matters described in the claims.

Unless otherwise specified, all embodiments and optional embodiments of this application may be combined with each other to form new technical solutions.

Unless otherwise specified, all technical features and optional technical features of this application can be combined with each other to form new technical solutions.

In the description of the present application, it should be understood that, orientations or positional relationships indicated by the technical terms such as "center", "longitudinal", "transverse", "length", "width", "thickness", "upper", "lower", "front", "rear", "left", "right", "vertical", "horizontal", "top", "bottom", "inner", "outer", "clockwise", "counter-clockwise", "axial", "radial", "circumferential", and the like are based on orientations or positional relationships shown in the drawings, and are merely for convenience of description of the present application and simplified description, and do not indicate or imply that an indicated apparatus or element must have a specific orientation or be configured and operated in a specific orientation, and thus should not be construed as limitations on the present application. In addition, features defined by "first" and "second" may explicitly or implicitly include one or a plurality of the features. In the description of the present application, unless otherwise specified, "a plurality of" means two or more.

In the description of the present application, it should be noted that, unless explicitly specified and defined otherwise, the terms "mounted", "connected", and "connect" are to be understood in a broad sense, for example, may be fixedly connected, detachably connected, or integrally connected; may be mechanically connected or may be electrically connected; may be directly connected, may be indirectly connected via an intermediate medium, or may be internal communication between two components. A person of ordinary skill in the art may understand specific meanings of these terms in the present application according to specific situations.

The following will specifically describe the embodiments of the present application with reference to the accompanying drawings. It should be noted that the following embodiments may be combined with each other or partially replaced in any possible manner. In addition, in the accompanying drawings, similar components have the same reference numerals.

Figure 2:
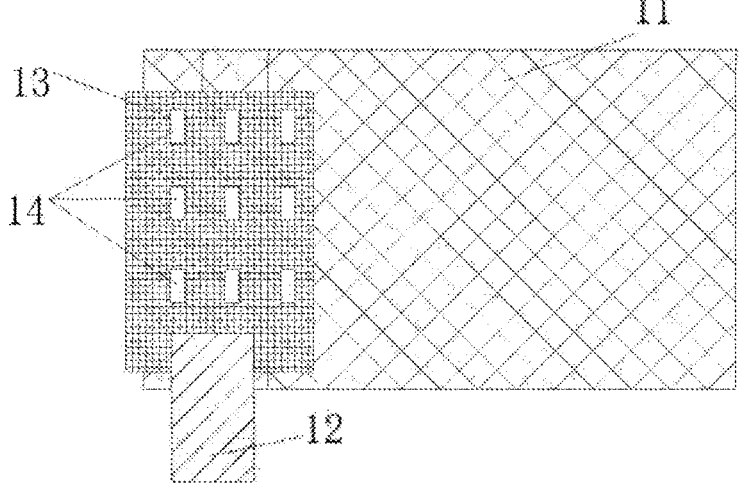
FIG. 2 is a schematic top view of a structure of an electrode sheet according to an embodiment of the present application.
Figure 3:
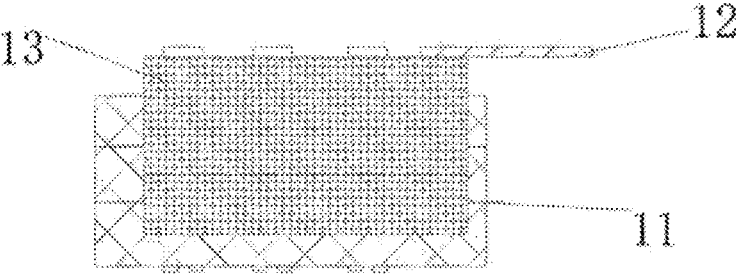
FIG. 3 is a schematic left view of a structure of an electrode sheet according to an embodiment of the present application.

Referring to FIG. 1 to FIG. 3, provided in the present application is a negative electrode sheet, including an electrode sheet body 11, a tab 12, and a connecting member 13. The electrode sheet body 11 includes a plurality of layers of carbon fibers. At least two of the plurality of layers of carbon fibers are connected to the connecting member 13. The tab 12 is electrically connected to the electrode sheet body 11 through the connecting member 13.

In the present application, the at least two of the plurality of layers of carbon fibers are connected to the connecting member 13, so that current extraction efficiency of the electrode sheet is improved, and connection strength between the electrode sheet body 11 and the connecting member 13 is improved.

The plurality of layers of carbon fibers are two or more layers of carbon fibers, which can be selected according to actual needs.

In some embodiments, as shown in FIG. 1, one end of the plurality of layers of carbon fibers is of a stepped structure, the stepped structure includes at least two step surfaces, and the at least two step surfaces are attached to the connecting member 13.

In the present application, one end of the plurality of layers of carbon fibers is of a stepped structure, and the step surface of the stepped structure is attached to the connecting member 13, thereby effectively increasing a contact area between the electrode sheet body 11 and the connecting member 13, further improving current extraction efficiency of the electrode sheet, and improving connection strength between the electrode sheet body 11 and the connecting member 13.

In some embodiments, as shown in FIG. 1, one end of the connecting member 13 is of an inverted stepped structure, and the inverted stepped structure is adapted to the stepped structure.

In the present application, the inverted stepped structure of the connecting member 13 is adapted to the stepped structure of the plurality of layers of carbon fibers, so that both the step surface and an end surface of the plurality of layers of carbon fibers are closely attached to the connecting member 13, thereby further increasing the contact area between the electrode sheet body 11 and the connecting member 13, further improving current extraction efficiency of the electrode sheet, and improving connection strength between the electrode sheet body 11 and the connecting member 13.

In some embodiments, the connecting member 13 is a metal mesh.

Use of the metal mesh as the connecting member 13 has the following advantages, (1) Manufacturing and molding process of the metal mesh is relatively simple, for example, the metal mesh can be manufactured by using a laser sintering method, an inkjet printing method, a grain boundary template self-assembly method, a photolithography method, or a nanoimprint method. The inverted stepped structure of the metal mesh can be simply implemented through cutting, welding, or the like. (2) The metal mesh material has low density, which can effectively reduce the weight of the battery and help improve energy density of the battery. (3) The metal mesh has good elasticity, and can ensure the contact area and connection strength between the metal mesh and the electrode sheet body 11 or the tab 12 when subjected to an external force.

In some embodiments, as shown in FIG. 1, the plurality of layers of carbon fibers include at least three layers of carbon fibers.

Increasing a quantity of layers of carbon fibers can increase a lithium storage capacity of the electrode sheet, thereby increasing a capacity of a secondary battery 5, and improving energy density of the battery. In addition, as a quantity of layers of carbon fibers increases, a connection method in the present application can effectively ensure current extraction efficiency of the electrode sheet and connection strength between the electrode sheet body 11 and the connecting member 13 without increasing difficulty of a connection process.

In some embodiments, as shown in FIG. 1, each of the plurality of layers of carbon fibers is attached to the connecting member 13.

Each of the plurality of layers of carbon fibers is attached to the connecting member 13, so that the connecting member 13 can extract a current from each layer of carbon fibers and converge the current, thereby further improving current extraction efficiency of the electrode sheet and connection strength between the electrode sheet body 11 and the connecting member 13.

In some embodiments, as shown in FIG. 1, the widths L of the at least two step surfaces are equal.

When the widths L of the step surfaces are equal, edges of the step surfaces form a chamfered plane. In this case, the thickness of the end surface of the plurality of layers of carbon fibers changes evenly. Even if one end of the connecting member 13 is a plane, the connecting member can be attached to the edge of the step surface, which helps simplify a manufacturing process of the connecting member 13 while further improving connection strength between the electrode sheet body 11 and the connecting member 13.

In some embodiments, as shown in FIG. 1, an angle θ between a chamfered plane formed by edges of the at least two step surfaces and a main plane of the electrode sheet body 11 is less than or equal to 45°.

When the angle θ between the chamfered plane formed by the edge of the step surface and the main plane of the electrode sheet body 11 is less than or equal to 45°, the width L of the step surface of the plurality of layers of carbon fibers is greater than or equal to the height of the step surface The height of the step surface is the thickness of the carbon fiber. In this case, the contact area between the plurality of layers of carbon fibers and the connecting member 13 is relatively large, thereby effectively ensuring current extraction efficiency of the electrode sheet and connection strength between the electrode sheet body 11 and the connecting member 13. The chamfered plane is not an actual end-surface shape, but an equivalent plane. The main plane of the electrode sheet body 11 is a plane where the length and width of the electrode sheet body 11 are located, and is perpendicular to a thickness direction of the electrode sheet.

In some embodiments, as shown in FIG. 1, the negative electrode sheet further includes a fastener 14, where the connecting member 13 is fixedly connected to the electrode sheet body 11 through the fastener 14.

The fastener 14 is disposed, which helps further improve connection strength between the electrode sheet body 11 and the connecting member 13, and helps simplify a process of fastening between the connecting member 13 and the electrode sheet body 11. The fastener 14 in the present application may be a mechanical connecting member such as a pin, a rivet, or a screw, or may be conductive adhesive, provided that fastening between the connecting member 13 and the electrode sheet body 11 can be implemented.

In some embodiments, as shown in FIG. 1, the connecting member 13 is fixedly connected to the at least two step surfaces through the fastener 14.

Because the step surface is a plane with a certain width, the connecting member 13 is fixedly connected to the step surface, which can effectively increase the connection area, thereby helping improve connection strength between the electrode sheet body 11 and the connecting member 13.

In some embodiments, as show in FIG. 2 and FIG. 3, a position at which the tab 12 is fastened to the connecting member 13 is different from a position at which the fastener 14 is fastened to the connecting member 13.

Because flatness of an end surface of the position at which the fastener 14 is fastened to the connecting member 13 is relatively poor, the position at which the tab 12 is fastened to the connecting member 13 is different from the above fastening position, thereby helping improve connection strength between the tab 12 and the connecting member 13.

In some embodiments, as shown in FIG. 2, the fastener 14 is a pin.

Use of the pin for fastening has a function of conducting a current in addition to providing a simple and reliable connection method. Therefore, use of the pin to fasten the electrode sheet body 11 and the connecting member 13 can further improve current extraction efficiency of the electrode sheet while ensuring connection strength between the electrode sheet body 11 and the connecting member 13.

In addition, with appropriate reference to the accompanying drawings, the following describes a secondary battery 5, a battery module 4, a battery pack 1, and an electric device in the present application.

In an embodiment of the present application, a secondary battery 5 is provided.

Generally, the secondary battery 5 includes a positive electrode sheet, a negative electrode sheet, an electrolyte, and a separator. During charge and discharge of the battery, active ions are intercalated and deintercalated back and forth between the anode plate and the cathode plate. The electrolyte functions to conduct ions between the positive electrode tab and the negative electrode tab. The separator is disposed between the positive electrode sheet and the negative electrode sheet, to mainly prevent positive and negative electrodes from being short-circuited and allow ions to pass through.

In some embodiments, the positive electrode sheet, the negative electrode sheet, and the separator may be manufactured into an electrode assembly 52 through a winding process or a lamination process.

In some embodiments, the secondary battery 5 may include an outer package. The outer package may be used to package the electrode assembly 52 and the electrolyte.

In some implementations, the outer package of the secondary battery 5 may be a hard case, for example, a hard plastic case, an aluminum case, or a steel case. The outer package of the secondary battery 5 may alternatively be a pouch, for example, a bag-type pouch. The material of the pouch may be plastic, and examples of the plastic include polypropylene, polybutylene terephthalate, and polybutylene succinate.

Figure 4:
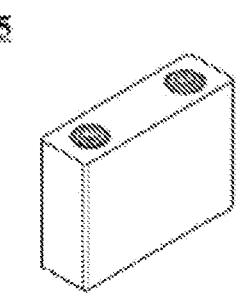
FIG. 4 is a schematic diagram of a secondary battery according to an embodiment of the present application.

The shape of the secondary battery 5 is not limited in the present application, and may be a cylindrical shape, a square shape, or any other shape. For example, FIG. 4 shows a secondary battery 5 of a square structure as an example.

Figure 5:
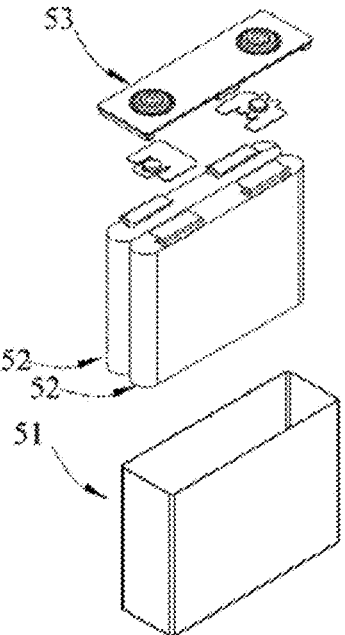
FIG. 5 is an exploded view of the secondary battery according to an embodiment of the present application shown in FIG. 4.

In some embodiments, referring to FIG. 5, the outer package may include a housing 51 and a top cover assembly 53. The housing 51 may include a bottom plate and side plates connected to the bottom plate, and the bottom plate and the side plates may define an accommodating chamber. The housing 51 has an opening communicating with the accommodating chamber, and the top cover assembly 53 can cover on the opening to close the accommodating chamber. The positive electrode sheet, the negative electrode sheet, and the separator may be formed into an electrode assembly 52 through a winding process or a lamination process. The electrode assembly 52 is packaged in the accommodating chamber. The electrolyte is impregnated into the electrode assembly 52. There may be one or a plurality of electrode assemblies 52 included in the secondary battery 5, and the number may be selected by those skilled in the art according to specific practical requirements.

In some implementations, the secondary battery 5 may be assembled into a battery module 4, there may be one or a plurality of secondary batteries 5 included in the battery module 4, and a specific quantity may be selected by those skilled in the art according to the application and capacity of the battery module 4.

Figure 6:
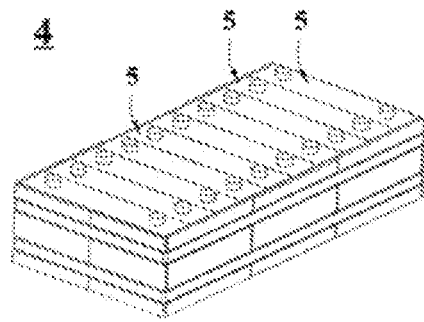
FIG. 6 is a schematic diagram of a battery module according to an embodiment of the present application.

FIG. 6 shows a battery module 4 as an example. Referring to FIG. 6, in the battery module 4, a plurality of secondary batteries 5 may be arranged in series in a longitudinal direction of the battery module 4. Certainly, the secondary batteries may alternatively be arranged in any other manner. Further, the plurality of secondary batteries 5 may be fixed by fasteners.

In some embodiments, the battery module 4 may further include a housing with an accommodating space. The plurality of secondary batteries 5 are accommodated in the accommodating space.

In some embodiments, the above battery module 4 may be further assembled into a battery pack 1, there may be one or a plurality of battery modules 4 included in the battery pack 1, and a specific quantity may be selected by those skilled in the art according to the application and capacity of the battery pack 1.

Figure 7:
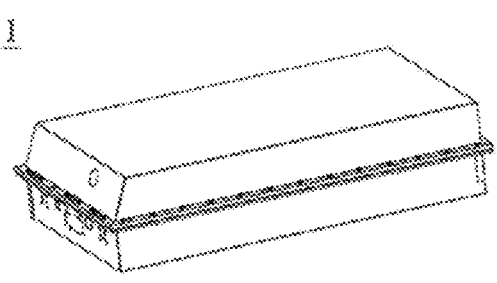
FIG. 7 is a schematic diagram of a battery pack according to an embodiment of the present application.
Figure 8:
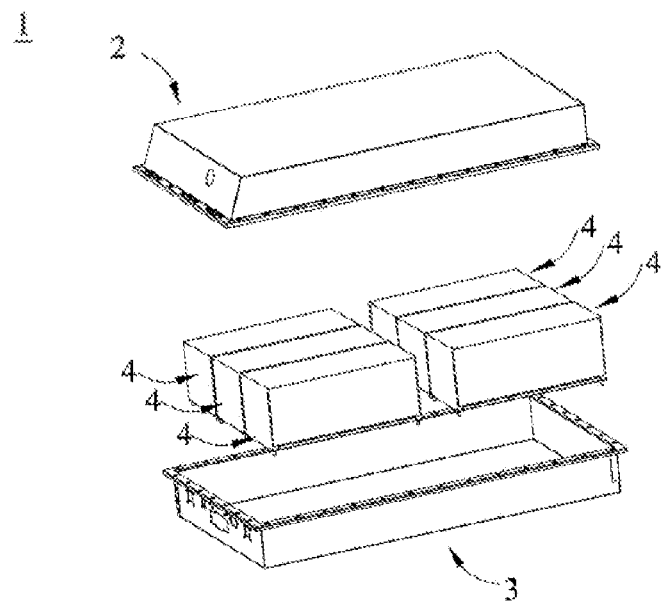
FIG. 8 is an exploded view of the battery pack according to an embodiment of the present application shown in FIG. 8.

FIG. 7 and FIG. 8 show a battery pack 1 as an example. Referring to FIG. 7 and FIG. 8, a battery case and a plurality of battery modules 4 disposed in the battery case may be included in the battery pack 1. The battery case includes an upper case 2 and a lower case 3, the upper case 2 being capable of covering the lower case 3 and forming a closed space for accommodating the battery modules 4. The plurality of battery modules 4 may be arranged in any manner in the battery case.

In addition, further provided in the present application is an electric device. The electric device includes at least one of the secondary battery 5, the battery module 4, or the battery pack 1 provided in the present application. The secondary battery 5, the battery module 4, or the battery pack 1 may be used as a power supply for the electric device, or as an energy storage unit for the electric device. The electric apparatus may include, but is not limited to, a mobile device (e.g., a cell phone or a notebook computer), an electric vehicle (e.g., a battery electric vehicle, a hybrid electric vehicle, a plug-in hybrid electric vehicle, an electric bicycle, an electric scooter, an electric golf cart, or an electric truck), an electric train, ship, or satellite, or an energy storage system.

As an electric device, the secondary battery 5, the battery module 4, or the battery pack 1 may be selected according to use needs.

Figure 9:
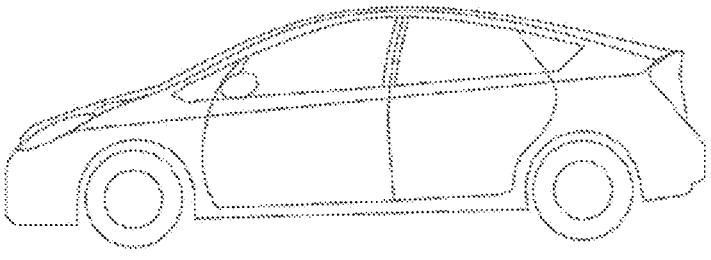
FIG. 9 is a schematic diagram of an electric device using a secondary battery as a power supply according to an embodiment of the present application.

FIG. 9 shows an electric device as an example. The electric device is a pure electric vehicle, a hybrid electric vehicle, a plug-in hybrid electric vehicle, or the like. In order to meet the demand for high power and high energy density of the secondary battery 5 by the electric device, the battery pack 1 or the battery module 4 may be used.

In another example, the apparatus may be a cell phone, a tablet computer, a notebook computer, or the like. This electric device is generally required to be thin and lightweight, and may use the secondary battery 5 as a power supply.

It should be noted that the present application is not limited to the above-described implementation. The above-described implementation is merely an example, and any implementation having substantially the same configuration as the technical concept and exhibiting the same operation and effect within the scope of the claims of the present application is included in the technical scope of the present application. In addition, various modifications that can be conceived by those skilled in the art may be made to the implementations without departing from the subject matter of the present application, and other implementations constructed by combining some of the constituent elements in the implementations are also included in the scope of the present application.

What is claimed is:

1. A negative electrode sheet, comprising:
an electrode sheet body, a tab, and a connecting member;

wherein:

the electrode sheet body comprises a plurality of layers of carbon fibers, at least two of the plurality of layers of carbon fibers are connected to the connecting member, and the tab is electrically connected to the electrode sheet body through the connecting member; and one end of the plurality of layers of carbon fibers is of a stepped structure, the stepped structure comprises at least two step surfaces, and the at least two step surfaces are attached to the connecting member.

2. The negative electrode sheet according to claim 1, wherein one end of the connecting member is of an inverted stepped structure, and the inverted stepped structure is adapted to the stepped structure.

3. The negative electrode sheet according to claim 1, wherein the widths L of the at least two step surfaces are equal.

4. The negative electrode sheet according to claim 3, wherein an angle θ between a chamfered plane formed by edges of the at least two step surfaces and a main plane of the electrode sheet body is less than or equal to 45°.

5. The negative electrode sheet according to claim 1, wherein the connecting member is a metal mesh.

6. The negative electrode sheet according to claim 1, wherein the plurality of layers of carbon fibers comprise at least three layers of carbon fibers.

7. The negative electrode sheet according to claim 6, wherein each of the plurality of layers of carbon fibers is attached to the connecting member.

8. The negative electrode sheet according to claim 1, further comprising:

a fastener;

wherein the connecting member is fixedly connected to the electrode sheet body through the fastener.

9. The negative electrode sheet according to claim 8, wherein the connecting member is fixedly connected to the at least two step surfaces through the fastener.

10. The negative electrode sheet according to claim 8, wherein a position at which the tab is fastened to the connecting member is different from a position at which the fastener is fastened to the connecting member.

11. The negative electrode sheet according to claim 8, wherein the fastener is a pin.

12. A secondary battery, comprising the negative electrode sheet according to claim 1.

13. A battery module, comprising the secondary battery according to claim 12.

14. A battery pack, comprising the secondary battery according to claim 12.

15. An electric device, comprising the secondary battery according to claim 12.

* * * * *